US006732935B2

(12) United States Patent
Vinogradov et al.

(10) Patent No.: US 6,732,935 B2
(45) Date of Patent: May 11, 2004

(54) MULTIPURPOSE LENS HOLDER FOR READING OPTICALLY ENCODED INDICIA

(75) Inventors: Igor R. Vinogradov, Bay Shore, NY (US); Alex Breytman, Bellmore, NY (US); Mark Krichever, Hauppauge, NY (US); David Tsi, Stony Brook, NY (US); Vladimir Gurevich, Stony Brook, NY (US); Richard Migliaccio, Bethpage, NY (US); Paul Dvorkis, East Setauket, NY (US); Jay Paul White, Bohemia, NY (US); Thomas Mazz, Huntington, NY (US); Howard Shepard, Great River, NY (US); Simon Bard, Setauket, NY (US); Jerome Swartz, Old Field, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 242 days.

(21) Appl. No.: 09/809,228

(22) Filed: Mar. 15, 2001

(65) Prior Publication Data

US 2002/0130183 A1 Sep. 19, 2002

(51) Int. Cl.$^7$ .................................................. G06K 7/10
(52) U.S. Cl. ........................... 235/472.03; 235/462.45; 235/454
(58) Field of Search ............................ 235/472.03, 454, 235/462.45, 462, 455, 472; 359/896, 196; 356/5

(56) References Cited

U.S. PATENT DOCUMENTS

| 4,105,332 | A | * | 8/1978 | Hohne et al. ................. 356/5.1 |
| 4,603,262 | A | | 7/1986 | Eastman et al. ............. 250/566 |
| 4,652,750 | A | | 3/1987 | Eastman et al. ............. 250/239 |
| 5,179,269 | A | | 1/1993 | Horie et al. ................. 235/455 |
| 5,326,962 | A | | 7/1994 | Peng ........................... 235/472 |
| 5,408,084 | A | * | 4/1995 | Brandorff et al. ......... 250/208.1 |
| 5,550,367 | A | * | 8/1996 | Plesko .................... 235/462.22 |
| 5,567,934 | A | * | 10/1996 | Zheng et al. ............ 250/237 R |
| 5,602,376 | A | * | 2/1997 | Coleman et al. ....... 235/462.44 |
| 5,627,359 | A | | 5/1997 | Amundsen et al. ......... 235/462 |
| 5,864,128 | A | * | 1/1999 | Plesko .................... 235/462.35 |
| 5,886,332 | A | * | 3/1999 | Plesko .................... 235/472.01 |
| 5,933,288 | A | * | 8/1999 | Plesko ........................ 359/896 |
| 6,198,862 | B1 | * | 3/2001 | Nakajima et al. ............. 385/33 |
| 6,233,098 | B1 | * | 5/2001 | Plesko ........................ 359/666 |

* cited by examiner

Primary Examiner—Michael G. Lee
Assistant Examiner—Kimberly Nguyen
(74) Attorney, Agent, or Firm—Carter, Deluca, Farrell & Schmidt, LLP (57) ABSTRACT

A unitary body of optical material and associated methods for reading indicia such as bar codes is provided. The unitary body can focus light from a light source into a beam, redirect light reflected from a target to a photodetector, and provide mechanical support for a light source, printed circuit board, or other indicia reader components. In comparison to conventional apparatus, the unitary body requires a reduced number of components and is therefore easier and less expensive to manufacture and assemble. The unitary design increases reliability and performance consistency while decreasing sensitivity to thermal and mechanical loading. Moreover, the unitary body reduces the overall tolerance budget of a reader and therefore facilitates mass production of optical apparatus and readers. The unitary body and associated methods may be implemented in a compact reader with the aforementioned advantages in the form of a pen, or can be integrated into an antenna of a wireless device, such as a cell phone or a PDA.

59 Claims, 11 Drawing Sheets

PRIOR ART

MULTIPURPOSE LENS HOLDER FOR READING OPTICALLY ENCODED INDICIA

BACKGROUND OF THE INVENTION

This invention relates to apparatus and methods for reading optically encoded indicia such as bar codes. More particularly, this invention relates to optical systems that project laser light toward an optically encoded target, collect light reflected from the target, and use the reflected light to generate a readable electrical signal corresponding to the encoded target.

Figure 1:
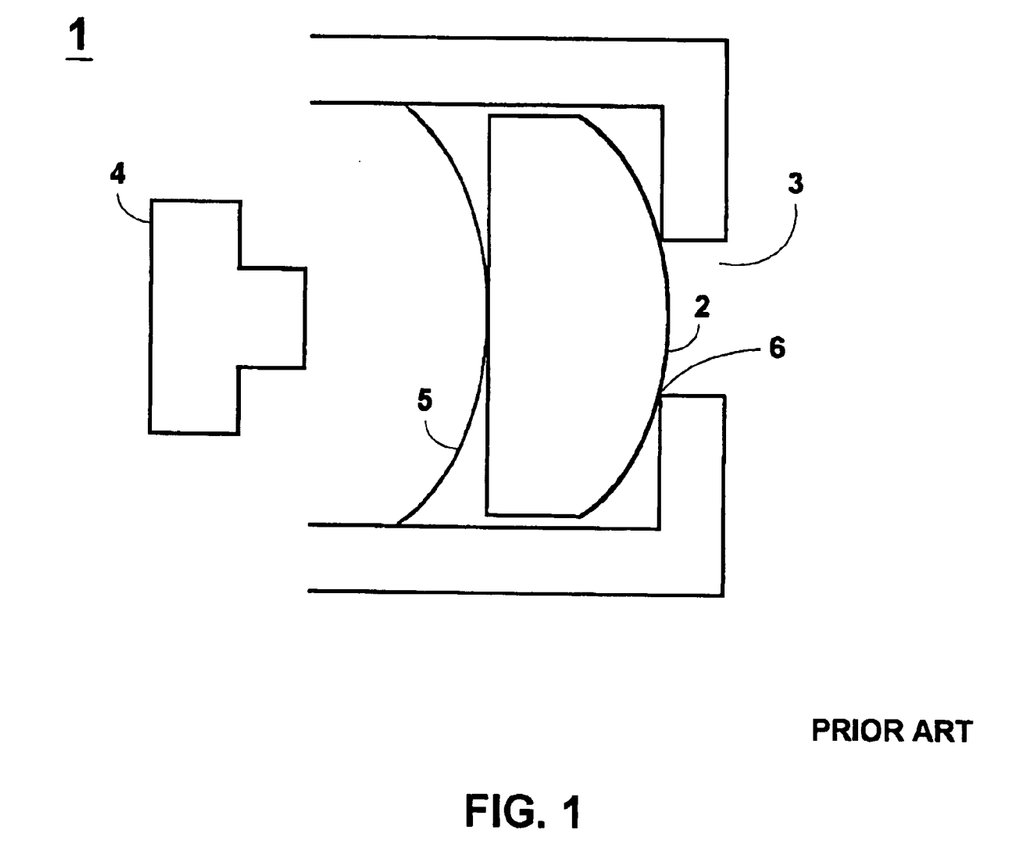
FIG. 1 is a cross-sectional view of a multi-component lens-aperture device representative of the prior art.

Conventionally, scanner or bar code reader optical systems require numerous optical components to control, project, and collect light. FIG. 1 illustrates some key components of a conventional laser light focusing device 1 that are commonly found in the prior art. Lens 2 and aperture 3 are used together to focus light from laser source 4. Star washer 5 is used to hold lens 2 in place against the inner lip 6 of aperture 3.

These individual parts must be produced and assembled within narrow manufacturing tolerances for a bar code reader to function properly. Additional components such as a laser source support and a collector for incoming light (not shown) further increase the difficulty and expense of producing a bar code reader. The large number of components combined with the need for assembly and inherent tolerance limits lead to large production costs and time requirements. Furthermore, the multi-component design leads to manufacturing flaws, decreased device longevity, sensitivity to thermal and mechanical loading, and inconsistent performance. Moreover, the multi-component design is ill-adapted for miniaturization.

Therefore, it would be desirable to provide apparatus and methods for reading indicia that require a reduced number of components, reduce the cost of manufacture and assembly, reduce manufacture and assembly time, increase reliability, decrease sensitivity to thermal and mechanical loading, and increase the consistency of performance.

It would also be desirable to provide apparatus and methods for reading indicia that reduce the overall tolerance budget of the reader and therefore facilitate mass production of optical apparatus and readers.

Moreover, it would be desirable to provide a compact indicia reader with the aforementioned advantages in the form of a pen.

SUMMARY OF THE INVENTION

It is an object of the invention to provide apparatus and methods for reading indicia that require a reduced number of components, reduce the cost of manufacture and assembly, reduce manufacture and assembly time, increase reliability, decrease sensitivity to thermal and mechanical loading, and increase the consistency of performance.

It is a further object of this invention to provide apparatus and methods for reading indicia that reduce the overall tolerance budget of the reader and therefore facilitate mass production of optical apparatus and readers.

It is a still further object of this invention to provide a compact reader with the aforementioned advantages in the form of a pen.

In accordance with the present invention, a unitary body is provided for controlling the profile of light and preferably laser light in an optical system that reads optically encoded indicia. The unitary body is preferably composed of optical material and includes an aperture forming area and a beam phase modifying area to form a beam for reading an optical code. In a preferred embodiment of the invention, an inner surface of the unitary body has an aperture forming outer region and a phase forming inner region. The unitary body also has an outer surface. In a preferred embodiment, the inner region of the inner surface and the inner region of the outer surface form a wavefront forming zone and everything outside the wavefront forming zone is an aperture forming zone. The embodiments of the unitary body produce a focus free system using a micro-aperture. In a particularly preferred embodiment, the outer surface of the unitary body is a beam splitter.

In one embodiment, the inner region of the inner surface is a converging region for focusing a portion of the light to form a beam and the outer region of the inner surface is a diverging region for diverging a portion of the light away from the beam.

In a preferred embodiment, the converging region is situated concentrically within the diverging region. The converging and diverging regions act together to form a beam that is directed through a surface in an output region of the unitary body to illuminate indicia. The outer surface of the unitary body which acts as a beam splitter, may further function as a collection surface that collects incoming reflected light. By splitting the beam, collection surface redirects a portion of the incoming light to a photodetector which generates an electrical signal indicative of light intensity for use in decoding an indicia such as a bar code.

In a particularly preferred embodiment, the unitary body includes a cavity adapted to accept and provide support for a laser source. The laser source is positioned optimally for providing light and for selective formation of a beam by the aforementioned converging and diverging regions. The unitary body may further include notches or studs for supporting circuit boards or associated components to provide support to the optical and mechanical components of the indicia reader.

In another particularly preferred embodiment of the invention, a unitary body is situated within a pen-shaped housing. This embodiment of the invention has the economical and mechanical benefits above and is an example of a hand held indicia scanner in accordance with the principles of the invention that is convenient to carry and use.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention includes a unitary body for use in an optical system, such as an optical code reader and in particular for reading and decoding encoded bar code indicia. The unitary body focuses light from a laser source into a laser beam. The unitary body has an aperture forming area which in one embodiment includes a diverging region of an inner surface of the unitary body to diverge a portion of the laser light away from the beam and has a beam phase modifying area which in one embodiment includes a converging region of the inner surface of the unitary body. In a preferred embodiment the converging region may be located concentrically within the diverging region. Thus configured, the converging and diverging regions act to selectively form a beam from the laser source by focusing a portion of the laser light into a beam and refracting peripheral light away from the beam to increase sharpness. The unitary body may be used in a variety of code readers including, but not limited to, scanners, wands, and pointers.

In one embodiment, light entering the unitary body, is formed into a beam by the converging and diverging regions and exits the unitary body through an output surface that is preferably perpendicular to the beam. The perpendicularity of the output surface allows the beam to pass straight through the output surface largely without refraction. The laser beam is directed at an encoded indicia, bar code, or other encoded target, and light is reflected back to the bar code reading unit. The unitary body has a collection surface, preferably adjacent the output surface, that collects the reflected light.

Preferably, the collection surface is at an oblique angle relative to the propagation direction of the incoming reflected light signal. The oblique angle allows the collection surface to redirect the reflected light to a photodetector that transduces the reflected light into an electrical signal indicative of the intensity of the reflected light. The photodetector outputs the electrical signal to signal processing circuit.

Incoming reflected light may be resolved into vector components parallel to and perpendicular to the plane of incidence defined by the beam of incoming light and the beam reflected from the collection surface. The parallel component is denoted as P polarization and the perpendicular component as S polarization. In a preferred embodiment, the oblique angle of the collection surface is chosen such that the collection surface preferentially redirects S-polarized incoming reflected light to the photodetector. Accordingly, the collection surface may therefore be considered a polarizing surface. However, it is not necessary that the collection surface be polarizing.

P-polarized incoming reflected light is preferentially transmitted through the collection surface and into the interior of the unitary body itself. The energy contained in the reflected S-polarized light is sufficient for a photodetector to generate an electrical signal indicative of the optically encoded target. In a preferred embodiment, the oblique angle of the collection surface is the Brewster's angle corresponding to the index of refraction of the unitary body.

Since a portion of the reflected light is transmitted through the unitary body and a portion is reflected, the collection surface of this embodiment is referred to as a Brewster's angle beam splitter.

It will be appreciated that in an embodiment of the invention in which the unitary body is contained in a housing, for example, a pen-shaped housing may be held in the hand of a user, there is a need to minimize the size of components and arrange them in a space-efficient manner. In such an embodiment, it may be necessary to position the collection surface at an angle with respect to incoming reflected light that is different from the Brewster's angle in order to reduce the space occupied by the collection surface. Even at angles greater than the Brewster's angle (as measured between collection surface and propagation direction of incoming light), sufficient S-polarized reflected light can be redirected to the photodetector to enable the encoded indicia to be read.

In another preferred embodiment, the output surface is recessed in the unitary body within the collection surface. According to this embodiment, laser light is emitted from the laser source, formed into a beam by the aperture forming area and the beam phase modifying area of the unitary body in the form of converging and diverging regions, and passed through the output surface. Stray or divergent light energy that diverges moderately from the beam will therefore fall outside the output surface onto the side of the collection surface internal to the unitary body. Because the collection surface is positioned at an oblique angle with respect to the transmitted laser beam, at least a portion of the divergent light incident on the internal side of the collection surface will be reflected away from the beam and thus trim the edge of the laser beam as it passes through the output surface. If the collection surface is positioned at a sufficiently high angle with respect to the angle of incidence of the moderately stray light, it will be completely reflected by the phenomenon of total internal reflection. The angle of the collection surface should be chosen to optimize the reflection of S-polarized light on the external surface of the unitary body. This angle is sufficient in most cases to give rise to total internal reflection of stray light energy on the surface internal to the unitary body.

It will be appreciated that although the unitary body is shown by way of example in various embodiment in the figures, that other configurations and combinations of functions achieved by the surfaces thereof are possible. For example, while the inner surface is used in one embodiment to effect aperture forming and phase modifying, these functions can be carried out by regions of the outer surface in whole or in part and in combination with regions of the inner surface. Moreover, while the inner regions of the surfaces of the unitary body have been used for beam phase modifying, it is understood that this function could be carried out by one of both of the outer regions or combinations of the inner and outer regions. The same is true for the aperture forming area which can include one or both of the inner regions or combinations of the inner and outer regions. Additionally, while the functions have been achieved by the use of converging and diverging regions, other optical elements can be implemented on the surfaces of the unitary body and/or by the shape of the unitary body to achieve the same functions.

The unitary body is preferably formed by injection molding of translucent material such as acrylic, but other molding processes and materials may also be used. It is therefore ideally suited to perform mechanical functions in addition to optical functions. In one embodiment, the unitary body may be provided with a cavity, the interior and walls of which may be used to support a laser source. Because optical systems with which the invention is designed to be used are usually controlled electronically, printed circuit boards are commonly used to provide the circuitry necessary to control such functions as the power distribution, signal processing, and data communication between the system components. In some embodiments, therefore, the unitary body may be provided with at least one notch, boss, or stud to support the edge of such a circuit board.

Some benefits of this configuration are that the unitary design permits a relatively easy combination of optical and mechanical features, is inexpensive to produce, and makes optimal use of available space. The uniformity of material used in the unitary design also reduces inter-component stresses that arise from thermal and mechanical loads even under normal-use conditions. In particular, the unitary design provides for the focusing of laser light into a beam, the adjustment of the beam profile or shape, and the collection and redirection of light reflected from a target. It also aids in the mechanical support of a laser source, circuit board, and/or other optical or electronic components of the associated system for reading signals from encoded indicia. The unitary design minimizes assembly costs and reduces the likelihood of failure or breakage. For example, the compactness of the unitary body enables a bar code reader to be placed in a housing in the form of a pen. The housing may also contain the photodetector, laser source, circuit boards, and auxiliary mechanical, optical, and electrical components.

Preferred embodiments of the apparatus and method of the invention will now be described with reference to FIGS. 2–11.

Figure 2:
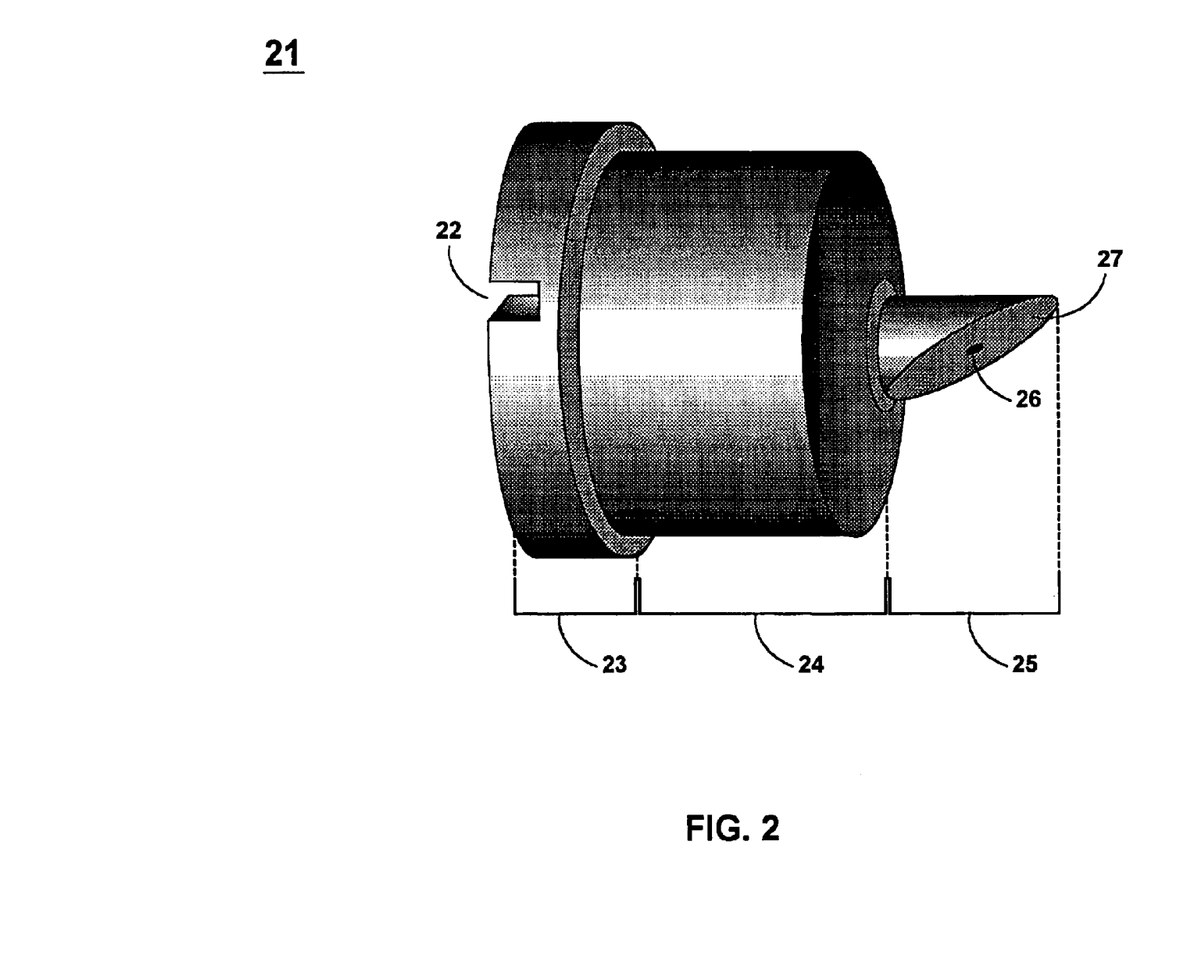
FIG. 2 is a perspective view of a preferred embodiment of a unitary body according to the present invention.

FIG. 2 is a perspective view of unitary body 21 showing circuit board notch 22, laser support region 23, laser beam focusing region 24, output region 25, aperture 26, and collection surface 27. A laser source may be housed within the cavity of laser support region 23. A cavity within laser beam focusing region 24 may further accommodate the laser source. Notch 22 may be used to support a circuit board or provide a base for supporting components that control and provide power to the laser source, photodetector, and signal processing circuitry.

Figure 3:
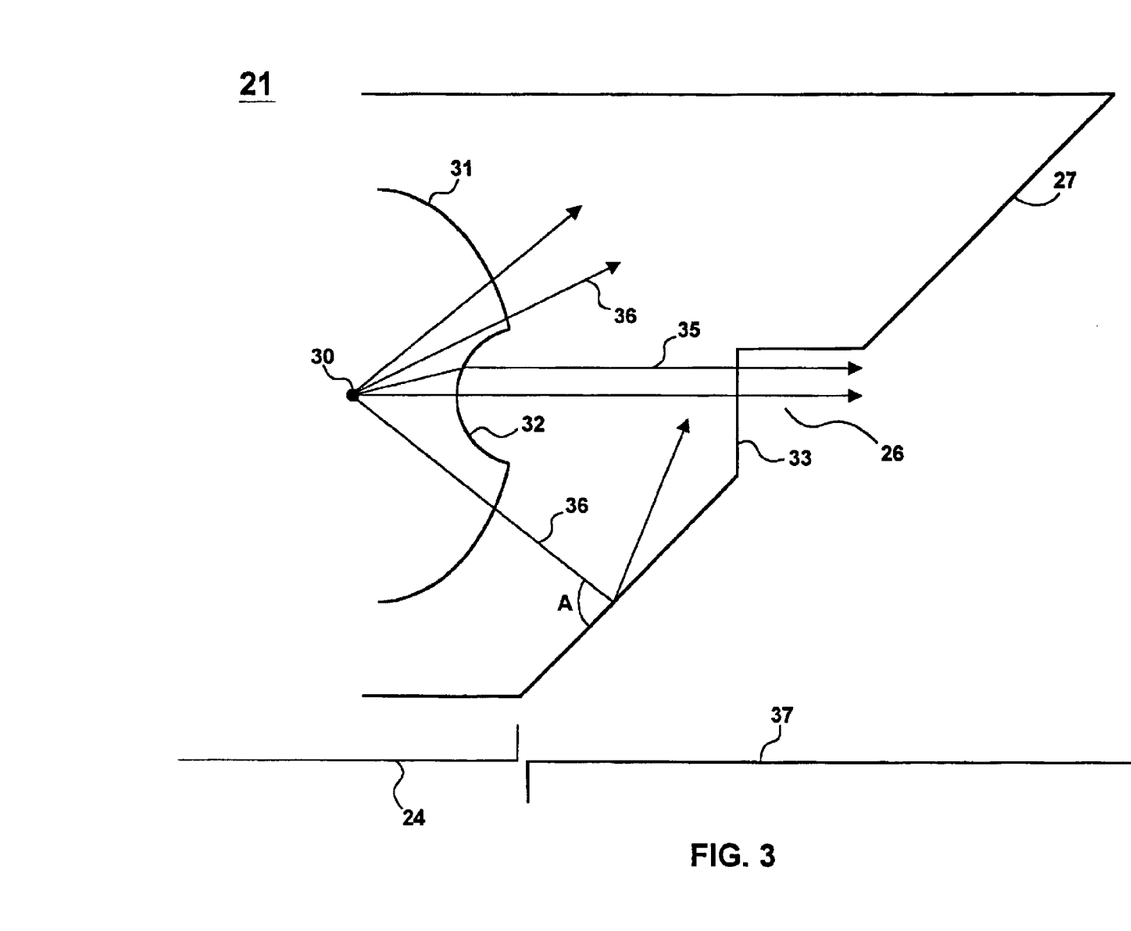
FIG. 3 is a schematic cross-sectional view of a portion of the unitary body of FIG. 2 illustrating some of the optical functions of the present invention.

FIG. 3 shows laser source 30 situated within laser beam focusing region 24. It will be understood that while laser source 30 may be located within laser beam focusing region 24, it may be supported by a mount that is supported at least in part by support region 23 (FIG. 2). Laser source 30 emits light in the cavity of focusing region 24. In a preferred embodiment, the converging region of the inner surface of the unitary body is a convergent lens 32 which converges a portion of light from laser source 30 into a transmitted beam, illustrated by rays 35. In the preferred embodiment, the diverging region of the inner surface of the unitary body is a divergent lens 31, disposed concentrically around convergent lens 32 in this embodiment, which removes diverging light 36 from transmitted beam 35 to increase the definition of transmitted beam 35. This decreases optical scatter as beam 35 passes through output surface 33, on its way to a target indicia.

Transmitted beam 35 passes substantially straight through output surface 33 because surface 33 is oriented perpendicular to transmitted beam 35. In principle, there should be no refractive bending of transmitted beam 35. Divergent light 36, including light passing through diverging lens 31, refracts into the volume of unitary body 21. To enhance the signal-to-noise ratio of the reader, it is desirable to prevent divergent light 36 from reaching a photodetector 37 and interfering with the detection of reflected light 40 containing target information. This is accomplished at least in part by allowing divergent light to strike the interior side of collection surface 27 and be reflected back into the volume of unitary body 21.

In particular, when angle A (FIG. 3) between divergent light 36 and the interior side of collection surface 27 is smaller than a critical value determined by the index of refraction of the unitary body, substantially all of divergent light 36 will be reflected and almost none will be transmitted through collection surface 27. Because output surface 33 is situated substantially concentrically within collection surface 27, the internal reflection of divergent light 36 by the internal side of collection surface 27 functions as an annular mask surrounding transmitted beam 35 and complements the function of divergent lens 31 by eliminating diverging light 36 from the periphery of transmitted beam 35.

Figure 4:
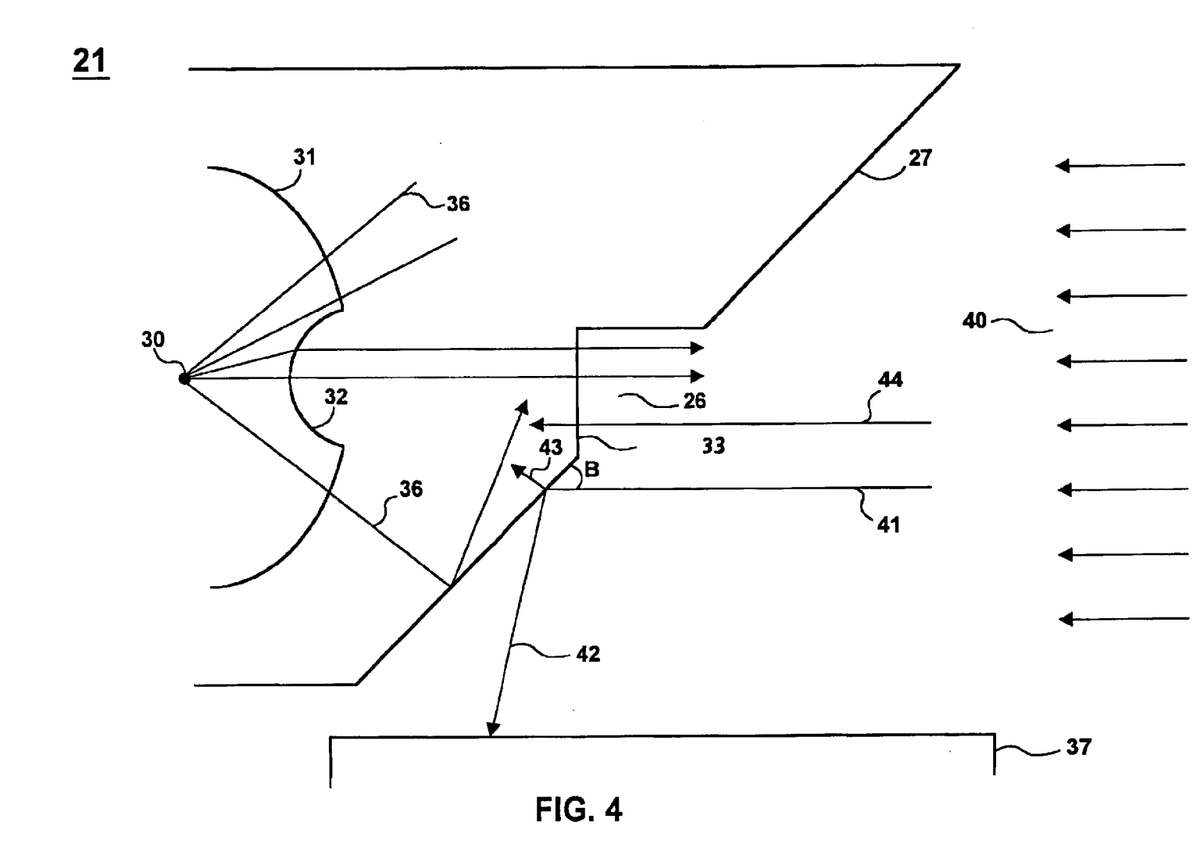
FIG. 4 is a schematic cross-sectional view of a portion of the unitary body of FIG. 2 illustrating some of the additional optical functions of the present invention.
Figure 7:
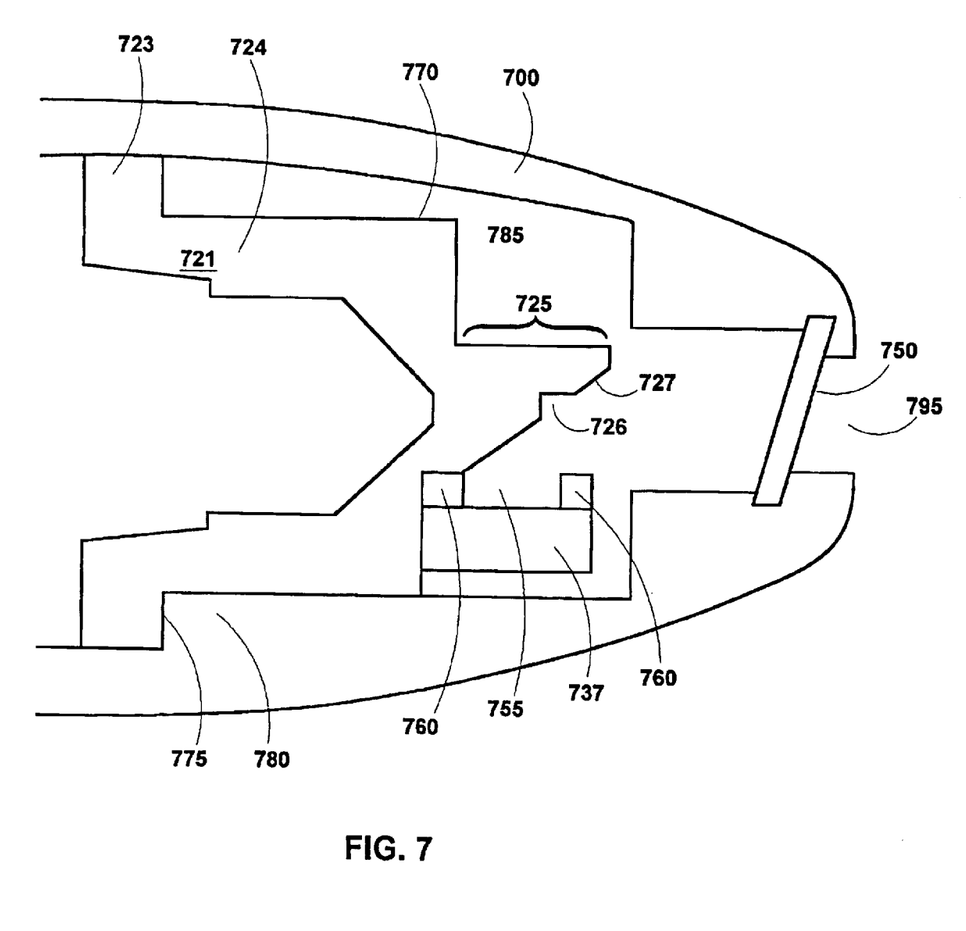
FIG. 7 is a cross-sectional view of a preferred embodiment of a unitary body like that of FIG. 2 situated in a pen-shaped housing.

FIG. 4 shows collection surface 27 redirecting a reflected light, illustrated by rays 40, to the photodetector 37. Reflected light 40 is returned to unitary body 21 from an encoded indicia such as a bar code label and is partially reflected by collection surface 27 after passing through a window, lens, filter, or any combination of such elements (FIG. 7, for example). Reflected light 40 has a specular component and a diffuse component. The specular component is polarized substantially identically to transmitted beam 35. The diffuse component is unpolarized, but resolvable into a first component, S, that is normal to a plane of incidence through collection surface 27 (e.g., a plane coincident with the plane of FIG. 3) and a second component, P, that is parallel to the incidence plane.

Collection surface 27 may reflect more S-polarized light 42 than P-polarized light and transmit more P-polarized light 43 than S-polarized light. In particular, angle B, between collection surface 27 and reflected light 41 can be chosen to transmit substantially all of the P-polarized component 43 of reflected light 41, thus maximizing the proportion of the total light redirected to photodetector 37 that is composed of the S-polarized component 42. Alternatively, angle B may be chosen so that collection surface 27 reflects substantially equivalent quantities of P-polarized and S-polarized light and is thus substantially non-polarizing.

It should be noted that specular light included in reflected light 40 is likely to saturate photodetector 37 because the laser source 30 emits P-polarized light. The polarization state is not altered by a reflective target in specular reflection. Therefore, the specularly reflected light returns to collection surface 27 in the P-polarized state and passes through collection surface 27. S-polarized component 42 of reflected light 40 is sufficient to allow photodetector 37 to generate an electrical signal indicative of the strength of S-polarized component 42 and, thus, of reflected light 40.

Figure 5:
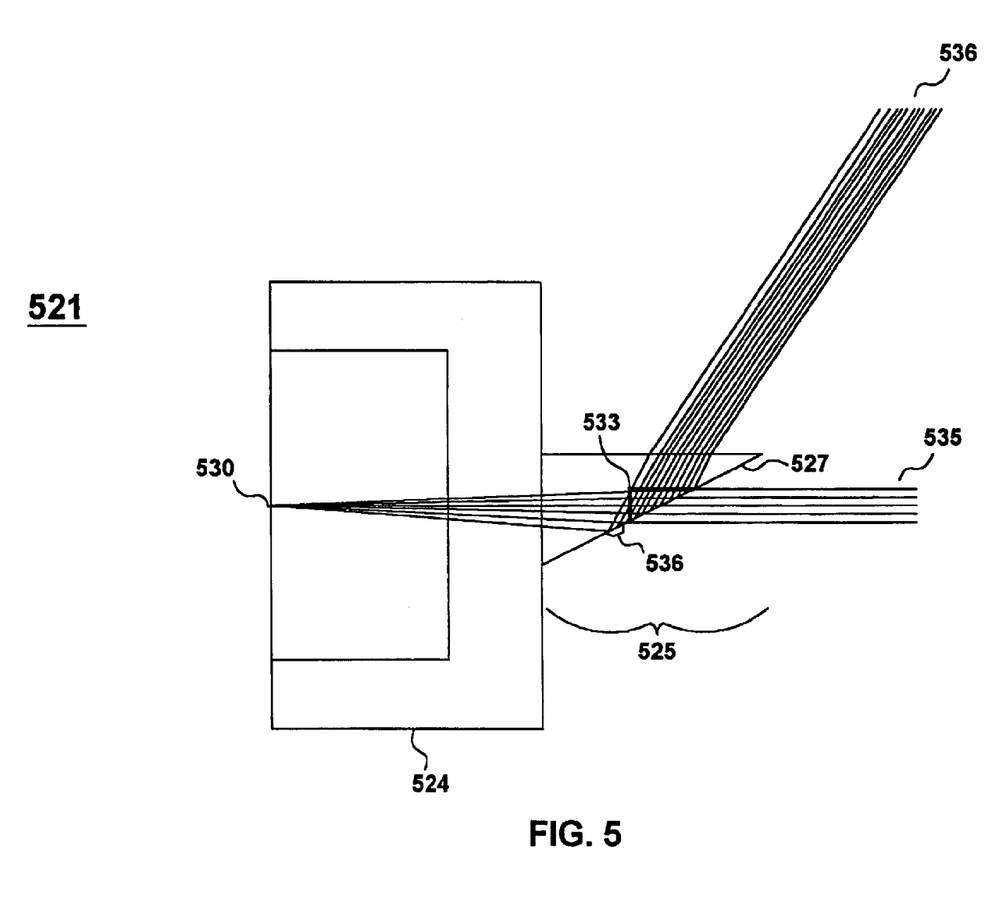
FIG. 5 is an illustrative example of a finite element simulation of an optical response of the unitary body of FIG. 2.

FIG. 5 shows a portion of a simplified finite element simulation of the invention. The reference numerals in FIGS. 5–9 have three digits, the last two of which indicate a correspondence with like elements in FIGS. 1–4. For example, element 521 of FIG. 5 corresponds to element 21 of FIG. 3, etc. In FIG. 5, laser source 530, situated within laser beam focusing region 524, emits laser light that is directed to output region 525 by focusing region 524. It will be understood that the finite element model is presented as an illustration and that converging lens 32 and diverging lens 31 were not included in the model for the sake of simplicity. In output region 525, diverging light 536 is prevented from passing through collection surface 527 by internal reflection, but beam 535 passes through output surface 533 (superimposed on model results for illustrative purposes).

Figure 6:
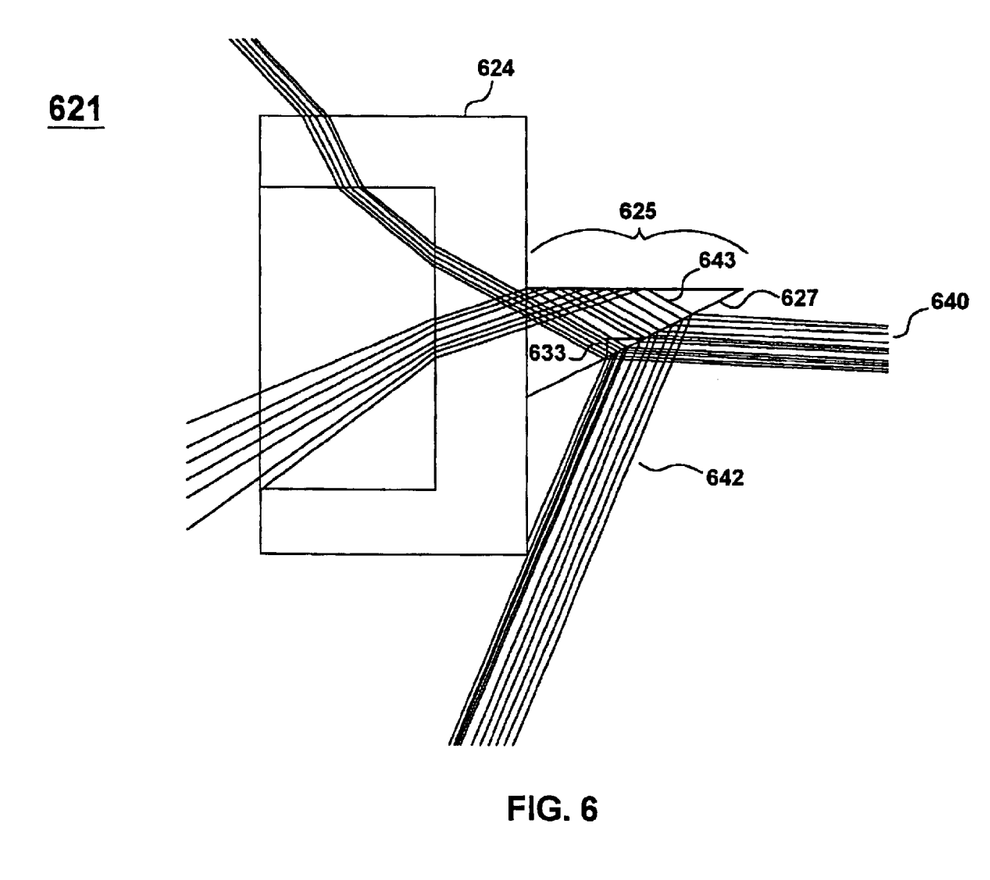
FIG. 6 is an illustrative example of a finite element simulation of additional optical responses of the unitary body of FIG. 2.

FIG. 6 is a portion of a solution of a finite element simulation, similar to that of FIG. 5, showing the splitting of incoming reflected light 640 by collection surface 627. P-polarized component 643 is transmitted through collection surface 627 while S-polarized component 642 of reflected light 640 is partially reflected (in the model, "PARTIAL" reflection is not illustrated for the sake of simplicity).

Figure 8:
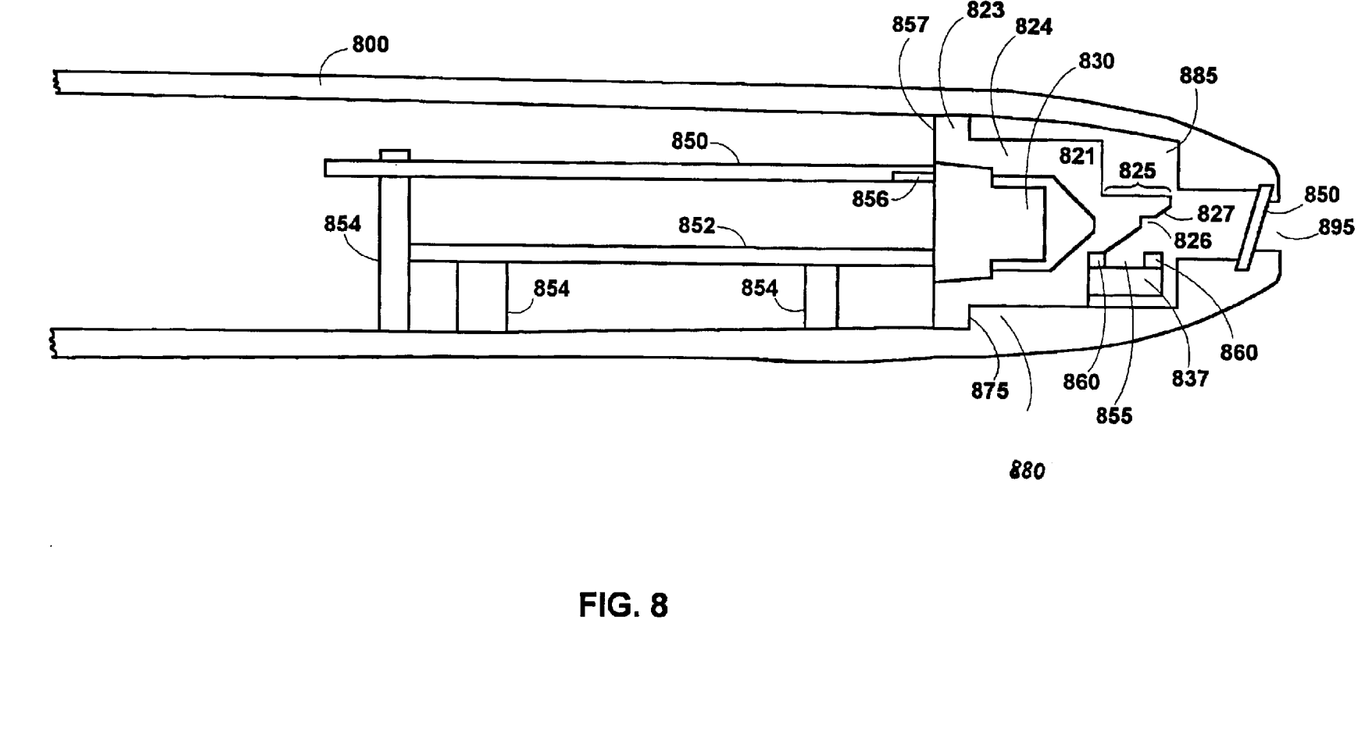
FIG. 8 is a cross-sectional view of a preferred embodiment of a unitary body like that of FIG. 2 situated in pen-shaped housing and mechanically supporting a laser source and circuit elements.

FIG. 7, a partial view of the apparatus of FIG. 8, shows a preferred embodiment in which unitary body 721 is mounted in a pen-shaped housing 700 that may be part of a wand used for reading indicia. Outer cylindrical surface 770 of laser beam focusing region 724 is press fit into bushing 780 inside housing 700. Output region 726 of unitary body 721 is thus positioned within cavity 785 of housing 700. Annular face 775 of laser support region 723 abuts bushing 780 and helps position unitary body 721 longitudinally within housing 700.

Output region 725 includes collection surface 727 and output surface 726 which correspond to their above-described counterparts. Collection surface 727 is oriented to redirect S-polarized reflected light, entering through aperture 795 and passing through filter 750, to photodetector 737. Photodetector 737 is mounted on portions 760 of a printed circuit board having aperture 755 to allow photodetector 737 to receive light from collection surface 727. The walls of the circuit board block stray light which otherwise may be directed onto a photodetector at an angle. Alternatively, an optical filter may take the place of aperture 755 or may be mounted above circuit board portions 760 for filtering the optical input to photodetector 737.

FIG. 8 shows an embodiment of a unitary body 821 similar to that of FIG. 7, but having stud 856 for supporting circuit board 850. FIG. 8 also shows a more complete view of a housing and its contents than does FIG. 7. FIG. 8 shows laser source 830 mounted within laser beam focusing region 824. As above, unitary body 821 may be press fit within pen shaped housing 800 using the outer cylindrical surfaces of support region 823 and laser beam focusing region 824. Annular surface 875 of support region 823 abuts a ledge on an end of bushing 880 to help position unitary body 821 longitudinally with housing 800.

Output region 825 is thus positioned within cavity 885 of housing 800 to transmit light from laser source 830 through output surface 826 after the light passes through focusing region 824. The light then passes through window/filter 850, and out of the housing through aperture 895. Output region 825 includes a collection surface 827 for redirecting S-polarized incoming reflected light to photodetector 837. Aperture 855 in portion 860 of circuit board 852 provides the necessary exposure of photodetector 837 to light from collection surface 827.

Stud 856 may protrude longitudinally from base 857 of support region 823 (e.g., at location on annular base 857 outside the plane of the figure) and supports printed circuit board 850. Support structures 854 support printed circuit board 852 and further support board 850. Laser support region 823 and laser beam focusing region 824 may pass through a hole in printed circuit board 852 to conserve space inside housing 800 and to further support circuit board 852.

Figure 9:
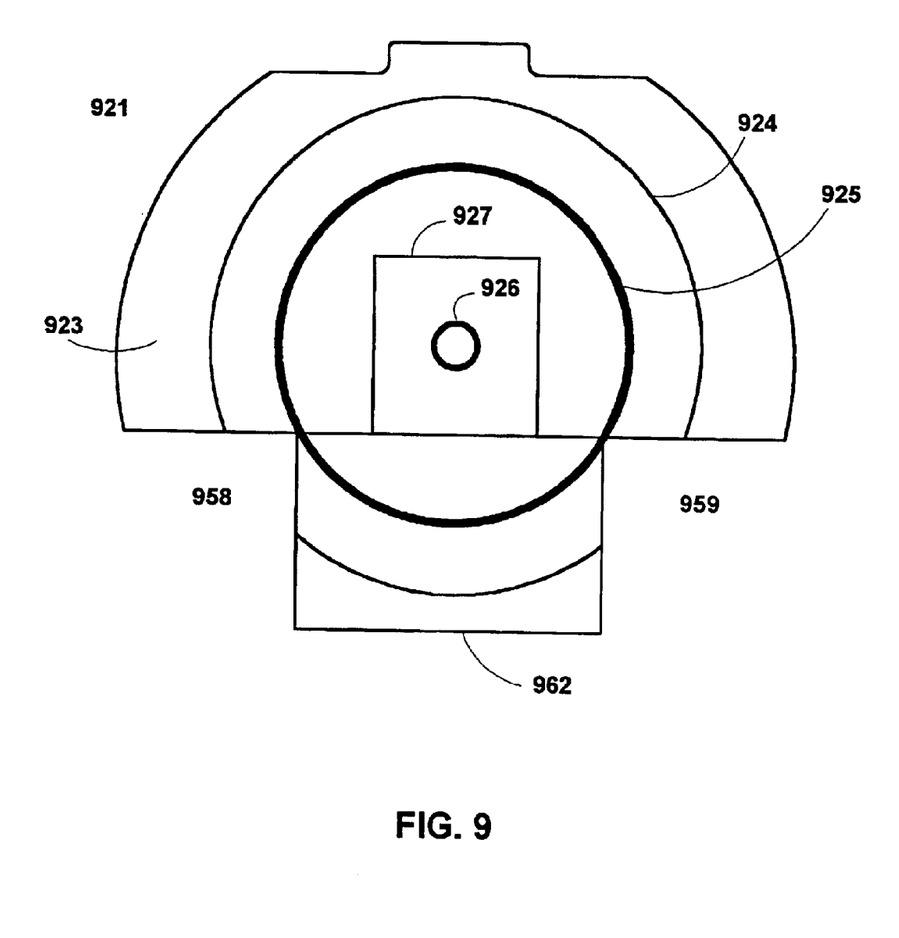
FIG. 9 is a transverse cross-sectional view of an embodiment of a unitary body like that of FIG. 2 showing a tab to facilitate mounting in coordination with an aperture in a circuit board.

FIG. 9 shows a transverse cross-section of an embodiment of unitary body 921 having rectangular cutouts 958 and 959 that form tab portion 962 of unitary body 921. Tab portion 960 may be inserted through a corresponding slot or cut-out in a printed circuit board such as 852 as shown in FIG. 8 and discussed above. As before, unitary body 921 includes collection surface 927, aperture 926, output region 925, and laser beam focusing region 924.

Figure 10:
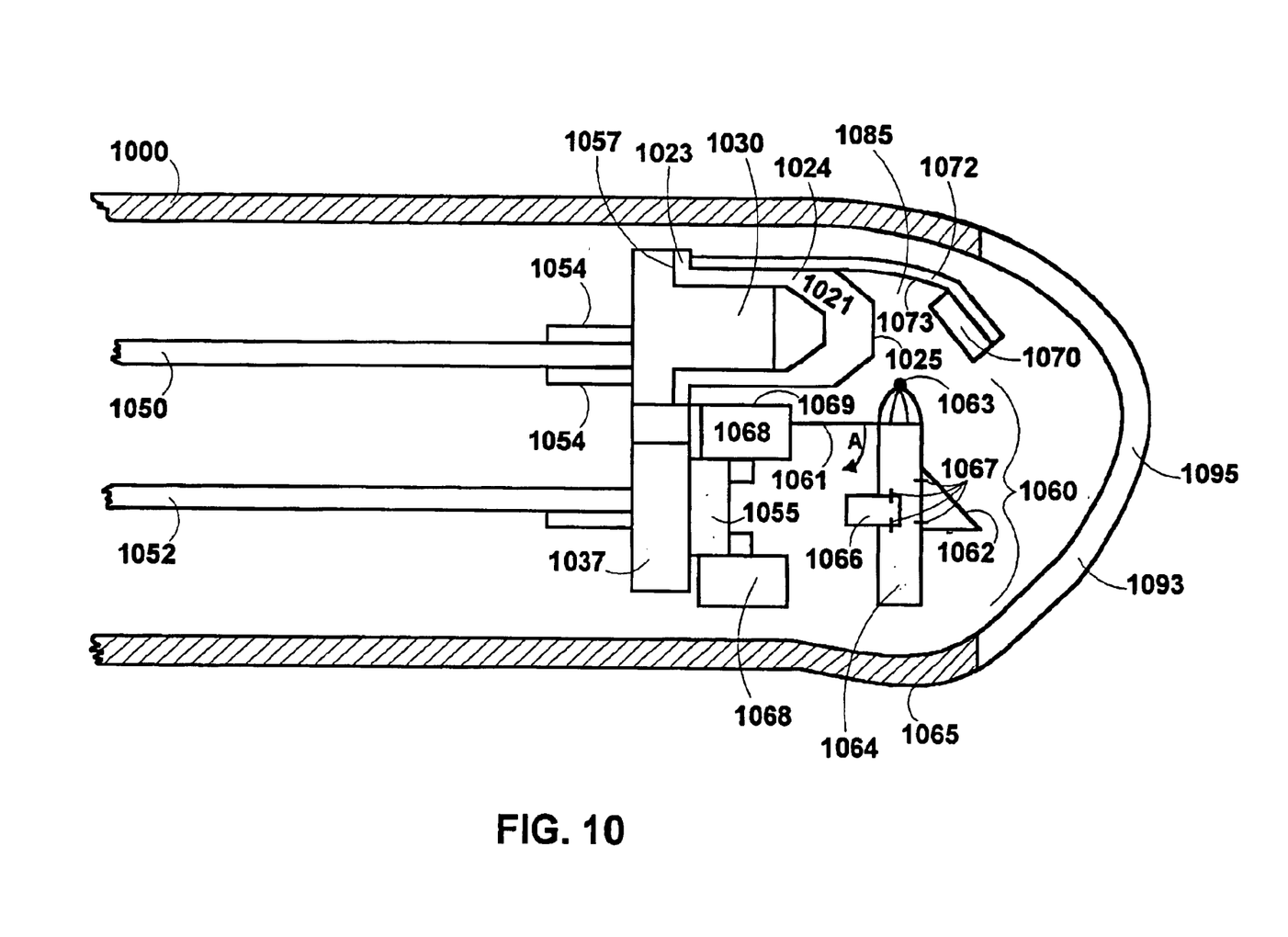
FIG. 10 is a cross-sectional view showing an embodiment of a unitary body similar to that of FIG. 2 mounted in a pen-shaped housing having a scanning element.

FIG. 10 shows unitary body 1021 mounted in-pen shaped housing 1000 and employed in coordination with scanning element 1060. The combination of unitary body 1021, pen-shaped housing 1000, and scanning element 1060 may be used to form a part of a scanning reader with a pen form factor. Laser source 1030 is mounted in laser support region 1023. Laser diode legs 1054 are soldered directly to circuit board 1050. Laser light emitted from laser source 1030 passes through laser beam focusing region 1024, and exits unitary body 1021 through output region 1025. (In this embodiment, output region 1025 does not require an oblique collection surface.) The emerging laser beam is then reflected by mirror 1070 toward mirror 1062. Mirror 1062 redirects the laser beam out through the exit window 1095 in dome 1093, thus allowing the beam to be directed at an encoded indicia. Exit window 1095 may contain filtering or focusing elements. Mirror 1070 is supported by cantilevered arm 1072.

In certain embodiments surface 1073 of cantilevered arm 1072 may function as a light collector, such as a parabolic collector, for directing signal light toward photodetector.

In FIG. 10, mirror 1062 is mounted on lens 1064. Lens 1064 may be of a variety of types of lenses including, but not limited to, a Fresnel lens or conventional lens. Lens 1064 further supports magnet 1066. Pins 1067, preferably comprising a polyester material (such as that sold under the trademark MYLAR7, by E. I. du Pont de Nemours & Company), affix mirror 1062 and magnet 1066 to lens 104. Lens 1064 is fixed to resilient support 1061 by clamp 1063. Resilient support 1061 is preferably a spring support that at rest is in the position shown in FIG. 10. Spring support 1061 is fixedly attached within housing 1000, for example, to housing 1069 of coil 1068.

When current is provided to coil 1068, shown in cross-section in FIG. 10, magnet 1066 is caused to exert torque on resilient support 1061 and draw lens 1064 and mirror 1062 toward coil 1068 in the direction of arrow A. Bulge 1065 in dome 1093 enables lens 1064 to deflect to the extent required for scanning purposes without interference from housing 1000 while reducing the overall dimensions of housing 1000.

If a time-varying current is supplied to coil 1068, the position of mirror 1062 will oscillate and mirror 1062 will function as a scan mirror. Thus light from laser 1030, directed toward mirror 1062 by mirror 1070, may be used to produce a laser beam that oscillates with respect to pen-shaped housing 1000 and sweeps or scans across an indicia even when pen-shaped housing 1000 is stationary.

The indicia is decoded by collecting light reflected from the indicia. Reflected light passes through exit window 1095 and is focused by lens 1064 onto photodiode 1037 after passing through filter 1055. Photodiode 1037 and filter 1055 may be disposed concentrically within coil 1068 as shown. Filtering elements may additionally or alternatively be incorporated into lens 1064 or may be mounted forward (on the dome side) of coil 1068.

Figure 11:
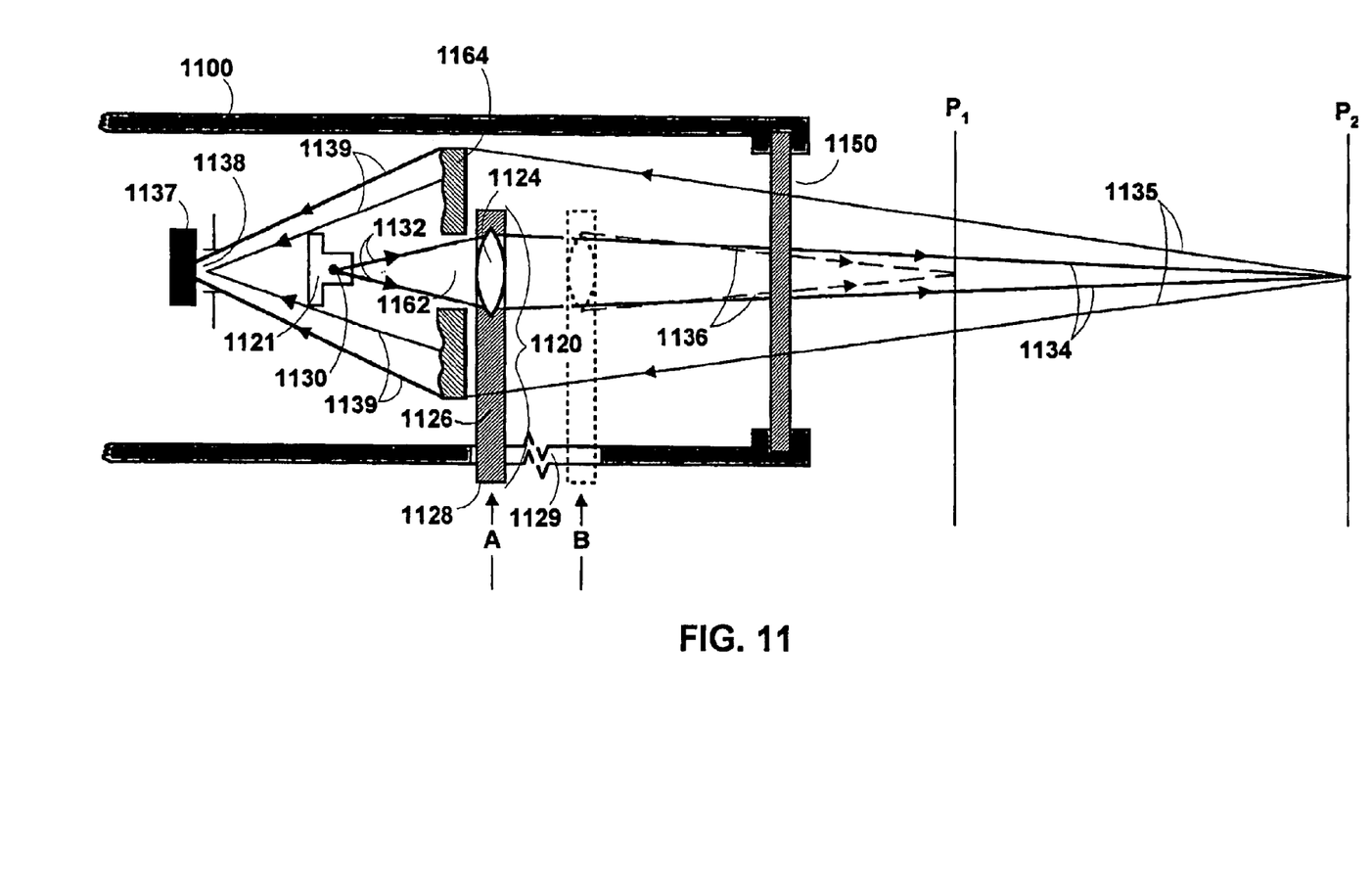
FIG. 11 is a cross-sectional view showing an embodiment of a unitary body similar to that of FIG. 2 mounted in a pen-shaped housing having an adjustable focusing lens.

FIG. 11 schematically shows unitary body 1121 mounted in the pen-shaped housing 1100 of a pointer code reader. Unitary body 1121 supports laser source 1130. Laser source 1130 emits laser light that passes through aperture 1162 in collection lens 1164. Light, as illustrated by paths 1132, then passes through lens 1124. Lens 1124 focuses the light on focal plane P2 as illustrated by paths 1134. Lens 1124 is illustrated in FIG. 11 in a first position for a long focal length. Lens 1124 is supported by lens support 1226. Lens 1124, lens support 1126, and slide switch 1128 together form lens assembly 1120. By moving sliding switch 1128 along slideway 1129, lens assembly 1120 can be repositioned relative to laser source 1130 in order to focus light from laser source 1130 at different focal planes. For example, paths 1134 show light converging at focal plane P2 when lens assembly 1120 is positioned at position A in FIG. 11 and paths 1136 show light converging at focal plane P1 when lens assembly is positioned at position B. For all settings of lens assembly 1120, light passes through exit window 1150. Exit window 1150 may include filtering and focusing elements and may be positioned at an oblique angle, as are corresponding windows in embodiment discussed above.

Light from the pointer scanner is manually directed at indicia to decode the indicia. Light is reflected from the indicia (e.g., along paths 1135), collected by collector lens 1164, and redirected to photodetector 1137 (e.g., along paths 1139). Collector lens 1164 may also include light filtering elements. In the embodiment illustrated in FIG. 11, collector lens 1164 is an annular lens and laser source 1130 is located substantially along a central axis (not shown) of collector lens 1164. It will be understood that this configuration uses space economically and enables the pointer scanner to fit into a small pen-shaped housing such as housing 1100, but other configurations are also within the scope of the invention.

The code readers described above are preferably portable and may be provided with either rechargeable or disposable batteries for providing power to the laser source, control system, signal processing system, user interface components (e.g., LED's for mode, power, and battery charge indication), and data input and output functions. Input and output may be wireless or wire-based. For example, input and output may be accomplished using an RF or infrared transmitter or transceiver. Code readers according to the invention may be further configured for interfacing with cellular telephones or personal data assistants. A code reader may be provided with its own antenna, for wireless communication such as a cellular phone antenna, for RF communication. Alternatively or additionally, readers may be configured for data transmission by LED, laser, or cable.

Because the present invention enables placing all the components of the bar code reader into a confined space having cylindrical configuration, in another preferred embodiment a wand reader can be built into a cylindrical antenna of a wireless device such as a cell phone, or a PDA (Portable Data Assistant) also known as a personal digital assistant. The tip of the antenna would house at least the light source, multipurpose lens holder and the photodetector. The detector circuitry could either be located within the antenna or inside the actual housing of the device. The rest of the wand processing circuitry would be integrated inside the device housing. To read a bar code, a user would position the antenna tip over the bar code, enable a scan function in the device and move the tip across the bar code in order for the detector to receive optical information from the illuminated bar code.

Additionally, code readers may be configured for communication with a host, a network, and network access points and may be compatible with a variety of communication protocols, including, but not limited to, spread spectrum frequency hopping systems.

Thus it is seen that apparatus and methods for reading bar codes that require a reduced number of components, reduce the cost of manufacture and assembly, reduce manufacture and assembly time, increase reliability, increase the consistency of performance, and facilitate mass production of optical apparatus and bar code readers are provided. An optical device for compact bar code reader in the form of a pen is also provided. One skilled in the art will appreciate that the present invention can be practiced by other than the described embodiments, which are presented for purposes of illustration and not of limitation.

What is claimed is:

1. An optical device for use in an optical system for reading an optical code, said optical device comprising a unitarily formed body of optically transmissive material having an aperture forming area and a beam phase modifying area both being integrally formed with said unitarily formed body and receptive of light from a light source for a focus-free forming of a beam for reading the optical code, said unitarily formed body also having an integrally formed collection surface for reflecting at least a portion of light returning from the optical code to a photodetector.

2. The device according to claim 1, wherein the aperture forming region comprises an outer region of an inner surface of the unitarily formed body and the beam phase modifying area comprises an inner region of the inner surface of the unitarily formed body.

3. The device according to claim 2, wherein the beam phase modifying area further comprises an inner region of an outer surface of the unitarily formed body and the aperture forming area further comprises an outer region of the outer surface of the unitarily formed body.

4. The device according to claim 3, wherein the outer region of the outer surface of the unitarily formed body, also referred to as the collection surface, is a beam splitter.

5. The device according to claim 3, wherein the inner region of the outer surface of the unitarily formed body is substantially perpendicular to said beam for transmitting said beam and the outer region of the inner surface is at an oblique angle relative to said beam to form a beam splitting surface for reflecting a portion of return light.

6. The device according to claim 5, wherein said oblique angle is set such that said beam splitting surface transmits a P-polarized component of said return light and redirects at least a portion of an S-polarized component of said return light.

7. The device according to claim 2, wherein the inner region of the inner surface comprises a converging region for focusing a portion of the light to form said beam and the outer region of the inner surface comprises a diverging region for diverging a portion of said laser light away from said beam.

8. The device according to claim 5, wherein said converging region is located concentrically within said diverging region.

9. The device according to claim 1, wherein the unitarily formed body further comprises a laser support region for supporting a laser source.

10. The device according to claim 9, wherein the unitarily formed body has at least one notch configured to support an edge of a circuit board.

11. The device according to claim 1, wherein the unitarily formed body comprises an outer surface for collecting return light.

12. The device according to claim 11, wherein the outer surface is a Brewster's angle beam splitter.

13. A multipurpose unitarily formed, optically transmissive body for supporting a laser source and collecting light reflected from a target in an optical system, the optical system for projecting and collecting laser light in order to read an encoded indicia, said multipurpose unitarily formed, optically transmissive body comprising: a laser support region for supporting said laser source; and at least one collection surface for collecting light reflected from said indicia, said laser support region and said collection surface being integrally formed with said unitarily formed, optically transmissive body.

14. The multipurpose unitarily formed body of claim 13 further comprising at least one notch, said at least one notch configured to support a circuit board.

15. The multipurpose unitarily formed body of claim 13 further comprising at least one stud, said at least one stud configured to support a circuit board.

16. The multipurpose unitarily formed body of claim 13 wherein said collection surface is substantially non-polarizing.

17. The multipurpose unitarily formed body of claim 13 wherein at least one collection surface can function as a beam splitter.

18. A multipurpose unitarily formed, optically transmissive body for supporting a laser source and collecting light reflected from a target in an optical system, the optical system for projecting a focused beam of laser light and collecting reflected light in order to read an encoded indicia, said multipurpose unitarily formed, optically transmissive body comprising:

a laser support region for supporting said laser source;

an output surface substantially perpendicular to said beam for transmitting said laser light; and a collection surface for collecting light reflected from said indicia, wherein said collection surface substantially transmits a P-polarized component and a portion of an S-polarized component of said reflected light and redirects an appropriate amount of the remaining S-polarized component of said reflected light to a photodetector to enable said optical system to read said indicia, said laser support region, said output surface and said collection surface being integrally formed with said unitarily formed, optically transmissive body.

19. The multipurpose unitarily formed body of claim 18 wherein said unitary body has at least one notch, said at least one notch being configured to support an edge of a circuit board.

20. A unitarily formed, optically transmissive body for collecting light reflected from a target in an optical system, the optical system for transmitting a beam of laser light and collecting reflected light in order to read an indicia, said unitarily formed, optically transmissive body comprising: an integrally formed output surface substantially perpendicular to said beam for transmitting said laser light; and an integrally formed collection surface for collecting light reflected from said indicia, wherein said collection surface substantially transmits a P-polarized component and a portion of an S-polarized component of said reflected light and redirects an appropriate amount of the remaining S-polarized component of said reflected light to a photodetector to enable said optical system to read said indicia.

21. The unitarily formed body of claim 20 wherein said collection surface has an oblique angle set such that said collection surface substantially transmits a P-polarized component of said reflected light and redirects a sufficient amount of an S-polarized component of said reflected light to enable said optical system to decode said indicia.

22. In a method for reading optical codes, a method of forming a beam of light comprising the steps of:

emitting light from a light source; and passing the light through a unitarily formed body of optically transmissive material which forms an aperture using an integrally formed aperture forming area and modifies a beam phase using an integrally formed beam phase modifying area to effect a focus free forming of a beam for reading the optical code, said unitarily formed body further collects reflected light received from the optical code and directs at least a portion of said received light to a photodetector using an integrally formed collection area.

23. The method according to claim 22, wherein the aperture forming region comprises an outer region of an inner surface of the unitarily formed body and the beam phase modifying area comprises an inner region of the inner surface of the unitarily formed body.

24. The method according to claim 23, wherein the beam phase modifying area further comprises an inner region of an outer surface of the unitarily formed body and the aperture forming area further comprises an outer region of the outer surface of the unitarily formed body.

25. The method according to claim 24 wherein the outer region of the outer surface of the unitarily formed body, also referred to as the collection area, is a beam splitter.

26. The method according to claim 25, further comprising receiving return light on the beam splitter and redirecting a portion of the return laser light to a photodetector.

27. The method according to claim 23, wherein the inner region of the inner surface comprises a converging region for focusing a portion of the light to form said beam and the outer region of the inner surface comprises a diverging region for diverging a portion of said laser light away from said beam.

28. The method according to claim 27, wherein said converging region is located concentrically within said diverging region.

29. The method according to claim 22, wherein the step of aperture forming further comprises the step of redirecting divergent light energy from the periphery of said beam using an internal reflection surface.

30. A method of generating a signal from an indicia having elements of varying reflectivity, said method comprising the steps of: passing P-polarized laser light from a laser source in a optical code reader through a unitarily formed body of optically transmissive material which forms an aperture using an aperture forming area and modifies a beam phase using an integrally formed beam phase modifying area to effect a focus free forming of a beam for reading the optical code; and detecting a sufficient amount of an S-polarized component of light reflected from said indicia to enable decoding of said optical code.

31. The method according to claim 30, wherein said detecting step comprises using at least one surface of said unitary body to redirect said S-polarized component.

32. The method according to claim 30, further comprising the step of supporting said laser source using said unitary unitarily formed body.

33. The method according to claim 30, further comprising the step of supporting at least one circuit board using said unitarily formed body.

34. A method of generating a signal from a target, comprising the steps of:
- focusing P-polarized laser light from a laser source along an optical path through a unitarily formed body of optically transmissive material in a bar code reader to said target;
- redirecting at least a part of an S-polarized component of light reflected from said target using at least one surface of said unitary unitarily formed body, said surface further substantially transmits the P-polarized component and the remaining S-polarized component of said reflected light; and
- detecting at least a part of said redirected S-polarized component of light reflected from said target.

35. The method of claim 34 wherein said projecting comprises manually controlling the position of the beam.

36. The method of claim 34 wherein said redirecting comprises using at least one Brewster's angle beam splitter to redirect said part of said S-polarized portion of light.

37. The method of claim 34 wherein said projecting comprises supporting said laser source using said unitarily formed body.

38. The method of claim 37 further comprising using said unitarily formed body for supporting at least one circuit board.

39. The method of claim 34 wherein said projecting step comprises supporting at least one circuit board using said unitarily formed body.

40. An optical code reader for reading an optical code by projecting laser light at said indicia and collecting light reflected from said optical code, the optical code reader comprising:
- a pen-shaped housing;
- a laser source for emitting said laser light;
- a unitarily formed body of optically transmissive material for focusing said light into a beam, said unitarily formed body having an integrally formed output surface perpendicular to said beam through which said beam can be transmitted toward said optical code and a an integrally formed collector surface positioned for directing at least a portion of said returning beam to a photodetector; and
- a detector for receiving a portion of light reflected from said optical code by said integrally formed collector surface and producing an electrical signal corresponding to the intensity of said reflected light, wherein said laser source, said unitarily formed body, said integrally formed collector and said detector are situated in said housing.

41. The reader of claim 40 wherein said unitarily formed body further comprises an aperture forming area and a beam phase modifying area both receptive of light from a light source for the focus free forming of a beam for reading the optical code.

42. The reader according to claim 41, wherein the aperture forming region comprises an outer region of an inner surface of the unitarily formed body and the beam phase modifying area comprises an inner region of the inner surface of the unitary unitarily formed body.

43. The reader according to claim 42, wherein the beam phase modifying area further comprises an inner region of an outer surface of the unitarily formed body and the aperture forming area further comprises an outer region of the outer surface of the unitarily formed body.

44. The reader according to claim 43, wherein the outer region of the outer surface of the unitarily formed body is a beam splitter.

45. The reader of claim 44 wherein said outer region of the outer surface is arranged at an oblique angle relative to said beam.

46. The reader of claim 45 wherein said oblique angle is set such that said beam splitter substantially transmits a P-polarized component of return light and redirects at least a part of an S-polarized component of said return light for decoding.

47. The reader according to claim 42, wherein the inner region of the inner surface comprises a converging region for focusing a portion of the light to form said beam and the outer region of the inner surface comprises a diverging region for diverging a portion of said laser light away from said beam.

48. The reader according to claim 47, wherein said converging region is located concentrically within said diverging region.

49. The reader of claim 40 wherein said unitarily formed body further comprises a laser support region for supporting said laser source.

50. The reader of claim 40 further comprising at least one circuit board in said housing.

51. The reader of claim 50 wherein said unitarily formed body has at least one notch for supporting said at least one circuit board.

52. A wand reader for reading an optical code by projecting a focused beam of light at said optical code and collecting return light reflected from said optical code, the reader comprising:
- a light source for emitting light energy;
- a unitarily formed body of optically transmissive material for focusing said light energy into the focused light beam, said unitarily formed body having an an integrally formed output surface perpendicular to said focused light beam through which said focused light beam can be transmitted toward said optical code and an integrally formed collector surface positioned for directing at least a portion of said returning beam to a photodetector; and
- a detector for receiving a portion of the return light reflected from said optical code and producing an electrical signal corresponding to the intensity of said return light, wherein said light source, said unitarily formed body and said detector are situated in an antenna for use with a wireless transceiver of a telephone or personal digital assistant.

53. The reader of claim 52 wherein said unitarily formed body further comprises an aperture forming area and a beam phase modifying area both receptive of light from a light source for the focus free forming of a beam for reading the optical code.

54. The reader according to claim 53, wherein the aperture forming region comprises an outer region of an inner surface of the unitarily formed body and the beam phase modifying area comprises an inner region of the inner surface of the unitarily formed body.

55. The reader according to claim 54, wherein the beam phase modifying area further comprises an inner region of an outer surface of the unitarily formed body and the aperture forming area further comprises an outer region of the outer surface of the unitary body.

56. The reader according to claim 55, wherein the outer region of the outer surface of the unitarily formed body, the collector surface, is a beam splitter.

57. The reader of claim 56 wherein said outer region of the outer surface is arranged at an oblique angle relative to said beam.

58. The reader according to claim 54, wherein the inner region of the inner surface comprises a converging region for focusing a portion of the light to form said beam and the outer region of the inner surface comprises a diverging region for diverging a portion of said laser light away from said beam.

59. The reader according to claim 58, wherein said converging region is located concentrically within said diverging region.

* * * * *